(12) United States Patent
Malchow

(10) Patent No.: US 7,281,718 B2
(45) Date of Patent: Oct. 16, 2007

(54) SHOPPING CART HANDLE SANITARY PROTECTOR AND COUPON

(76) Inventor: Georgianna T. Malchow, 2811 Hillcrest Ave., Augusta, GA (US) 30909

( * ) Notice: Subject to any disclaimer, the term of this patent is extended or adjusted under 35 U.S.C. 154(b) by 0 days.

(21) Appl. No.: 11/079,764

(22) Filed: Mar. 14, 2005

(65) Prior Publication Data
US 2005/0218612 A1  Oct. 6, 2005

Related U.S. Application Data

(60) Provisional application No. 60/558,002, filed on Mar. 31, 2004, provisional application No. 60/565,701, filed on Apr. 27, 2004.

(51) Int. Cl.
*B62D 39/00* (2006.01)

(52) U.S. Cl. .................... 280/33.992; 280/33.991; 150/154

(58) Field of Classification Search ........... 280/33.992, 280/33.991, 33.993, DIG. 4; 224/572, 277, 224/411, 503; 150/106, 154; 705/14; 40/661.12; 74/551.9
See application file for complete search history.

(56) References Cited

U.S. PATENT DOCUMENTS

| | | | |
|---|---|---|---|
| 2,803,849 A | 8/1957 | Peters | |
| 3,909,034 A | 9/1975 | Trubiano | |
| 4,512,504 A * | 4/1985 | Owlett | 224/572 |
| 4,805,937 A | 2/1989 | Boucher et al. | |
| 5,215,319 A | 6/1993 | Farris | |
| 5,425,546 A | 6/1995 | Gerber et al. | |
| 5,427,392 A | 6/1995 | Duer | |
| 5,429,377 A | 7/1995 | Duer | |
| 5,722,672 A | 3/1998 | Frederick | |
| 5,820,142 A * | 10/1998 | Duer | 280/33.992 |
| 6,065,764 A | 5/2000 | Moseley | |
| 6,543,794 B1 | 4/2003 | Tyree | |
| 6,714,837 B1 * | 3/2004 | Brackmann et al. | 705/14 |
| 6,817,066 B1 * | 11/2004 | Williams et al. | 280/33.992 |
| 6,832,766 B2 * | 12/2004 | Stokes | 280/33.992 |
| 6,869,085 B2 * | 3/2005 | Pettigrew et al. | 280/33.992 |
| 2002/0050085 A1* | 5/2002 | Durham | 40/661.12 |
| 2004/0192399 A1* | 9/2004 | DeCost et al. | 455/566 |
| 2005/0028637 A1* | 2/2005 | Coty | 74/551.9 |

* cited by examiner

*Primary Examiner*—Hau Phan
(74) *Attorney, Agent, or Firm*—Thomas, Kayden, Horstemeyer & Risley, LLP

(57) ABSTRACT

A handle shield (22, 50) is provided for placement about the handle (20) of a conventional shopping cart. The handle shield is formed of sheet material that forms a sleeve (26) that surrounds the handle to shield the hands of the user of the cart from contacting the handle, and a hang tag (28, 54) is suspended from the handle that bears advertisements, coupons, and/or bar codes for displaying to the shopper the different goods available in the store and for redeeming at the checkout counter of the store.

4 Claims, 5 Drawing Sheets

SHOPPING CART HANDLE SANITARY PROTECTOR AND COUPON

CROSS REFERENCE

Applicant claims the benefit of U.S. Provisional Patent Applications 60/558,002 filed Mar. 31, 2004 and 60/565,701 filed Apr. 27, 2004.

BACKGROUND OF THE INVENTION

Retail stores that use wheeled shopping carts for the collection of goods from a store, such as a supermarket, usually are pushed from behind. The shopper engages the horizontally extending cylindrical handle of the cart and pushes the cart from place to place about the store. In some instances, a small child, such as a toddler, is placed in the collapsible seat adjacent the handle of the shopping cart so that the shopper can have his or her hands free for shopping while being positioned close to the child.

Under the above noted circumstances, the hands of the shopper and possibly the hands of the child of the shopper come in contact with the shopping cart handle. Contaminants present on the cart handles are spread by this contact. The spread of germs starts when hands touch the cart handle and the hands are subsequently placed on other surfaces that are touched by others. The contamination path is even more frightening with children that hold onto a shopping cart handle and then bring their hands to their mouths or when a child puts his or her mouth directly on the handle.

When the cart is later moved to the checkout counter, the goods within the cart are removed, checked out and bagged, and the empty cart is then moved to another area where it is made available for a subsequent shopper. When the next shopper and possibly the shopper's child use the cart, the subsequent shopper and child contact the same handle with their hands and contact the germs, etc. that remain on the handle from the previous shopper.

Since it is sometimes necessary for a sick person to shop at a retail store, particularly at a supermarket to buy food and where shopping carts are used, the handles of shopping carts are a hazardous place to contact with a person's hands. The shopper, and especially the shopper's child, are subjected to the germs and other undesirable remaining matter of the previous shopper left behind on the handle of the shopping cart, and the subsequent shopper is likely to contact the germs of the previous shoppers that used the same cart and apply his/her own germs and other undesirable matter to the handle for the next shopper.

It is likely that during the shopping in the store the shopper will handle or touch trays containing raw meat and/or raw poultry while making the decision to buy or select another product. Usually traces of blood and other liquid matter exuded from then raw contents is present on the exterior of the package, but these contaminants on the outside of the trays are difficult to detect and are contacted by the unwary shopper. Shoppers usually touch the outside of the trays, then touch the cart. The germs can remain on the surfaces of the cart, including on the handle of the cart, for hours or even longer. It's common knowledge that raw meat and raw poultry can carry serious pathogens like *E. Coli*. These bacteria can kill a child or an elderly person whose immune system is underdeveloped or weakened.

Another path of contaminants is the carts left outside the store. Customers are exposed to potential viruses from birds that perch on the carts.

Very few supermarkets wash or clean their carts. Recently some stores have provided wipes treated with sterilizing fluid that tend to reduce the contamination of the cart handles; however, a time of about five minutes is required for the sterilizing fluid to become effective. Also, the customer may not want to make direct contact with the sterilizing fluid.

Except as noted above, the proprietor of the supermarket usually does not provide any means for avoiding contact from one customer to the next of the germs and other matter left by previous customers on the shopping cart handles. In order to avoid the contact of a customer with contaminants present on the handles of a wheeled shopping cart, some customers have worn gloves or have applied some protective surface to the handle, or have wiped the handle clean before contacting the handle with his or her hands. It is believed that the expense and inconvenience of providing such shopping cart handle protectors is a deterrent to the grocery store chain and other retail stores for supplying such handle protectors. However, the health conscious public has become more aware of the compelling scientific evidence that proves shopping carts are a health risk, and the public is looking for an effective solution to reduce of bacterial contact.

It is to this problem that this invention is directed.

SUMMARY OF THE INVENTION

Briefly described, the present invention comprises a shopping cart handle sanitary protector shield that is conveniently supplied by the proprietor of a retail store, such as a supermarket, for mounting about the handle of the shopping cart. The protector shield that can be conveniently formed into a sleeve functions like a handle shield and is of a length sufficient to span across the major length of the handle of the shopping cart and of a width that is suitable for connecting the sleeve about the handle.

In one embodiment, the sleeve is of greater width than the circumference of the handle so that it can overlap upon itself, and a connector extends to the overlapped portions of the sleeve, connecting the sleeve about the handle. A message is applied to the sleeve for reading by the shopper that uses the shopping cart. Typically, the message would include an advertisement of goods within the store, so as to provide the shopper with knowledge of the goods and possibly the price, as an inducement to purchase the goods.

Another embodiment of the invention includes a coupon, or several coupons applied to the sleeve of the handle shield. The coupon would be redeemable at the checkout counter for reducing the price of the goods advertised by the sleeve. The coupons may be printed on the sleeve and the sleeve removed from the cart at the check out counter for redeeming the coupons, or the coupons may otherwise be removably applied to the sleeve, as by serrations between the coupons and the rest of the sleeve, by adhesively attaching the coupons to the sleeve, etc. so that they are easily removable.

The coupons may also bear a bar code so that it can be easily identified at the checkout counter and the proper credit is redeemed against the advertised product that may have been selected by the shopper.

In order to provide adequate space for the coupon, advertisement and/or bar code, the handle sleeve may be of a width that is substantially greater than the circumference of the shopping cart handle, so as to form a hang tag that extends from the shopping cart handle. The hang tag bears the bar code, advertisement, coupon, and/or other indicia that the proprietor may approve for presenting to the shoppers of the store.

Also, the handle shield may be sponsored by the manufacturers of the goods that are to be presented for sale in the retail store. This way, the manufacturers of the goods, not necessarily the proprietor of the retail store, would arrange for the production and distribution of the shields. This provides the customers of the retail store with the sanitary protection that might be highly desired by the customer, and provides the producer of the advertised products with the ability to expose its products to the customer throughout the entire time the customer uses the shopping cart. Moreover, it also provides the producer of the goods advertised on the sleeve with the ability to provide coupons directly to the shopper that uses the shopping cart, increasing the likelihood that the shopper will purchase the goods of the producer of the shopping cart handle sanitary protector sleeve.

With the advertisements highly visible and coupons positioned directly in front of the customer that identify the goods and possibly the price of the goods during the entire shopping trip, and the immediate physical barrier provided against germs, the sleeve sends a message to the customer that the advertisers are a business that cares about the well being of the customers.

DETAILED DESCRIPTION

Figure 1:
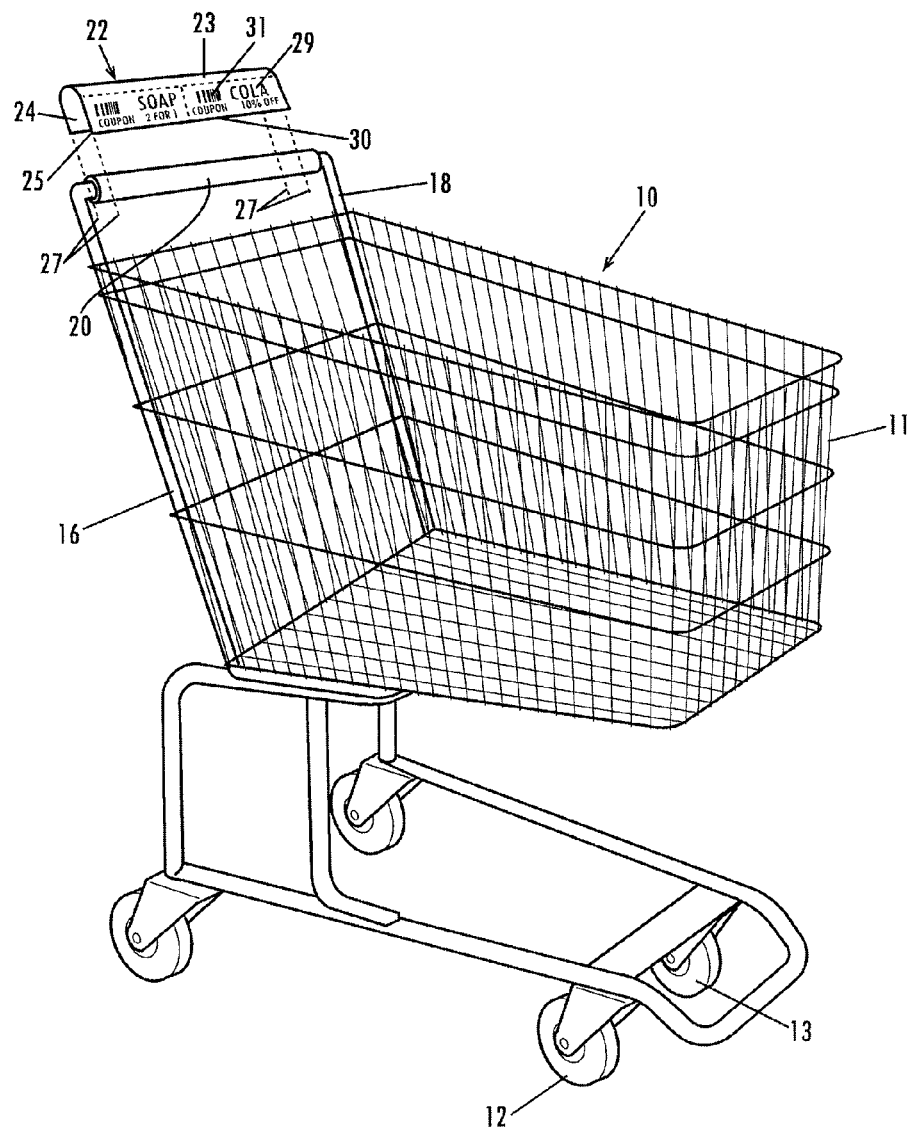
FIG. 1 is a perspective illustration of the shopping cart, showing the shopping cart sanitary protector sleeve positioned adjacent the handle of the cart, showing how this embodiment of the invention would be applied to the handle.

Referring now in more detail to the drawings in which like numerals indicate like parts throughout the several views, FIG. 1 illustrates a shopping cart 10 of conventional design, which includes a basket 11, front caster wheels 12 and 13, and rear wheels 14. The basket 11 is supported on a framework 16, and a handle assembly 18 extends upwardly and rearwardly from the basket 11. Also, a child's seat (not shown) may be present in the basket 11, with the seat arranged to support the baby in a rearwardly facing direction.

Handle assembly 18 includes a horizontal handle 20 that is usually located upwardly and rearwardly with respect to the basket 11, and usually comprises a tubular, rectilinear bar.

When the shopping cart is used in a retail store, such as in a supermarket, the shopper usually grasps the handle 20 with his/her hand so as to push the cart and guide the cart through the premises of the store.

Figure 2:
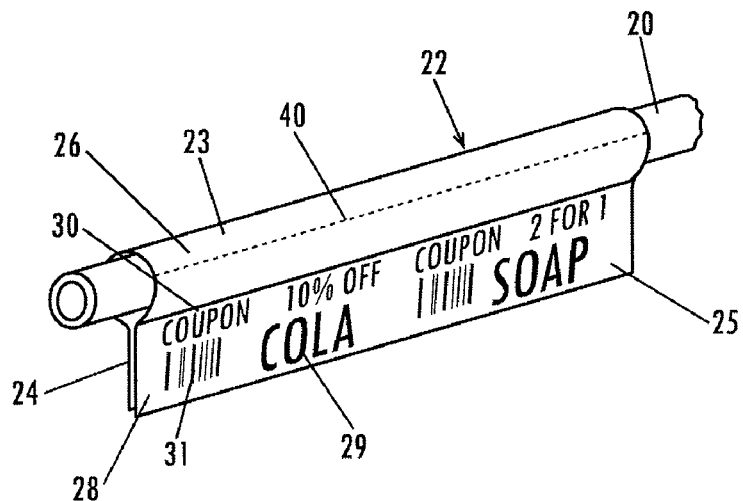
FIG. 2 is a perspective illustration of a portion of the shopping cart handle, with the handle shield extending around the handle.

A handle shield 22 is provided for the shopper that fits over the handle 20. As shown in FIG. 1, the handle shield may be formed of sheet material that can be arranged in a U-shape, which forms it in a curved body portion 23 with a pair of opposed substantially flat end portions 24 and 25. The opposed end portions are moved as indicated by the dash lines 27 into overlapping relationship with respect to handle 20, and the opposed end portions are connected to each other on the far side of the handle. As shown in FIG. 2, this forms a handle sleeve 26 about the handle 20 of the cart and a hang tag 28 that is suspended from the handle of the cart.

Figure 3:
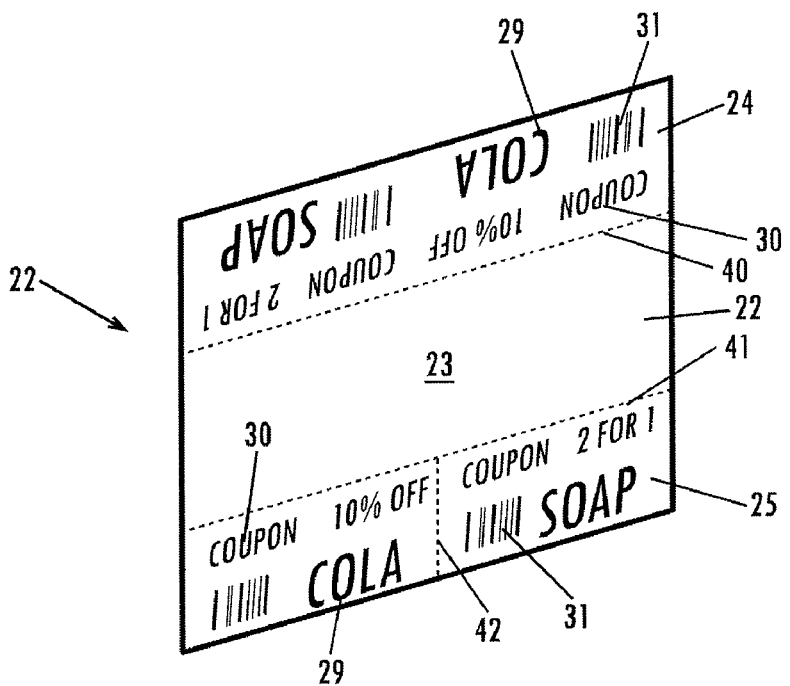
FIG. 3 is a perspective view of a layout of the handle shield, showing the printed surface of the handle shield.

As shown in FIG. 3, the handle shield 22 in its flat, laid out configuration includes the body portion 23 and opposed end portions 24 and 25, with the advertisements 29, coupons 30, and bar codes 31 all applied to one surface of the handle shield. Preferably, the advertisements, coupons, and bar codes are applied to both of the opposed end portions 24 and 25 so that when the handle shield is wrapped about the handle of the shopping cart, the body portion 23 is formed into a sleeve 26, with the opposed end portions gathered together in overlying relationship to form a hang tag 28, with the advertisements, coupons, and bar codes facing in opposite directions where they are visible from both sides of the handle. An advertisement may also be applied to the body portion 23.

The advertisement 29, coupons 30 and bar code 31 relate to one another so that when the bar code 31 is read at the check-out counter, the goods of the advertisement and the coupon are recognized through the computer system of the grocery store, providing the shopper with a discount or other benefit as advertised on the handle shield or otherwise advertised in the premises of the store. In some instances, the information carried by the opposed end portions 24 will include just the bar code and the advertisement, or just the advertisement and the coupon, or possibly other information, such as a message to the customer concerning local or national affairs.

Figure 4:
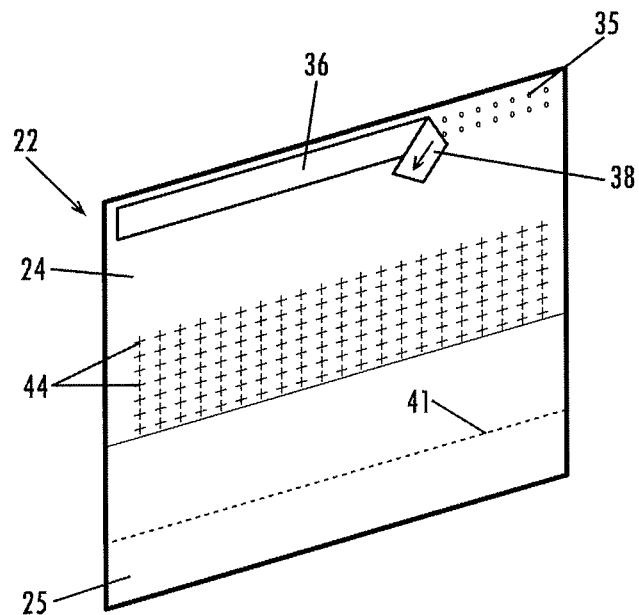
FIG. 4 is a reverse perspective view of a layout of the handle shield, showing how a peel-away strip that may be applied to the line of adhesive and can be removed for the line of adhesive to expose the adhesive of the handle shield.

As shown in FIG. 4, the reverse side of the handle shield is formed with an adhesive line on one of the opposed end portions such as end portion 24. A peel-away strip 36 may be releasably adhered to the adhesive line to protect the adhesive line before use of the handle shield. When the handle shield 22 is to be applied to the handle of the shopping cart, as shown in FIGS. 1 and 2, if a peel-away strip 36 is adhered to the adhesive line it is stripped away from the adhesive as indicated by arrow 38. This exposes the adhesive line. The person to use the shopping cart or the store employee that is to prepare the shopping cart then folds the handle shield 22 about the handle 20 of the shopping cart 10 in such a manner that the adhesive line 35 folds into contact with the opposed end portion 25 of the handle shield, making adhesive contact therewith. This connects the handle shield in a sleeve configuration about the handle 20 of the shopping cart, as illustrated in FIG. 2.

Figure 5:
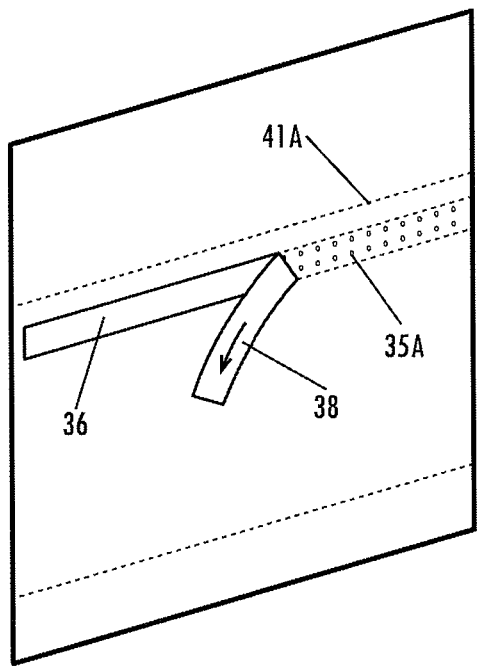
FIG. 5 is a reverse perspective view of a layout of a modified handle shield, showing a longer end portion and the adhesive line and peal away-strip displaced from the edge of the end portion.
Figure 6:
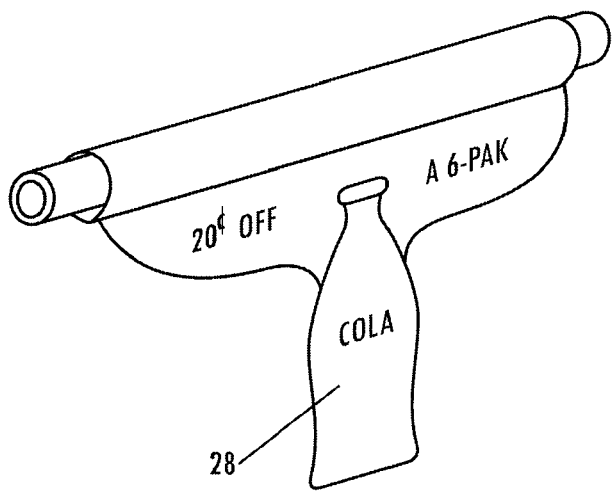
FIG. 6 is a perspective view of the shopping cart handle with a handle shield formed in the shape of the product it advertises.

The length of the handle shield may be of a different length than illustrated in FIG. 2 of the drawings and may be of a different shape than illustrated in the drawings to suit the advertisement to be displayed. For example FIG. 5 shows a wider shield in its laid out configuration with the adhesive line and its peal-away strip displaced from the edge of an end portion so that the sleeve my be tightly fitted about the handle of the cart and the end portions that form the hang tag 28 of the shield extend farther away from the handle of the cart. Also, FIG. 6 shows the hang tag 28 in the shape of the product to be advertised, such as a cola bottle or a cereal box, and bears the image of the product to be advertised.

It will be noted that since the advertisements, coupons, and/or bar codes 29-31 may be applied on the same surface but at opposed ends of the handle shield, the advertisements, coupons, and bar codes will become a part of the hang tag 28 and face in opposite directions, being visible on both sides of the handle.

The customer using the cart will be confronted with the information applied to the handle shield during the entire time of use of the shopping cart at the supermarket or other type store. This is a constant reminder to the customer of the items advertised on the handle shield, and of the possibility of a discount or two-for-one bargain, etc. that is available to the customer.

As shown in FIG. 3, a score line 40 may be formed across the handle shield 22 to form a weakened area where the handle shield can be separated away from the cart handle 20. The score line 40 may be formed in the body portion 23 so that when the handle shield is grasped by its opposed end portions and pulled away from the handle at an angle, there is a tendency of the handle shield to separate along the score line 40. This is an easy and neat way of removing the handle shield from the handle of the cart.

Also, other score lines 41 and 42 can be formed adjacent the advertisements, coupons and/or bar codes for the purpose of neatly separating these items from the handle shield.

While the handle shield is shown in FIG. 2 as being applied to the handle with its opposed end portions aligned in an overlying relationship, FIG. 5 shows the opposed end portions may be lengthened so as to extend farther away from the adhesive line 41A, so that they are free of adhesive and are more readily removable from the handle shield at the check-out counter where the bar codes would be read. FIG. 5 also shows the score line 41A is displaced from the edge of the end portion and the adhesive line 35A is further displaced from the same edge.

The supplier of the handle shield may also desire to have the material of the handle shield receive a light coat of disinfectant 44 on the back of the handle shield, with the disinfectant arranged to face the handle 20 and thereby tending to sterilize the handle. The disinfectant should be chosen so that it will not be exposed to the user of the cart, particularly to a child that occupies the child's seat of the cart, so as to avoid the risk of contact with either the child or the adult using the cart.

Figure 7:
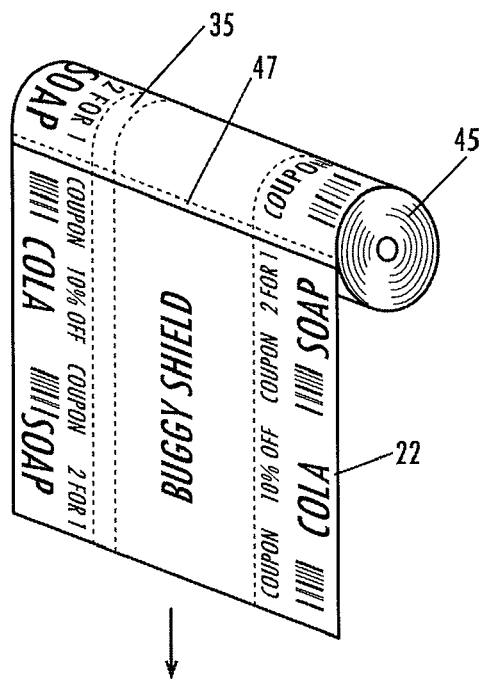
FIG. 7 is a perspective view of a connected series of the handle shields formed in a reel for dispensing to a customer.

As illustrated in FIG. 7, the handle shields 22 may be formed in bulk for use at the supermarket, etc. One example of the bulk supply of the handle shields is to connect them in end-to-end series, and supply the series in a reel 45. The end-to-end series connected relationship places the adhesive line 35 in alignment from shield to shield, with each layer of the handle shields protecting the adhesive line until the outside shield is pulled away from its underlying shield. A weakened score line 47 is formed between each one of the handle shields 22 so that the user can pay out the end most handle shield and tear it away from the next adjacent handle shield at the weakened score line 47. The reel may be supported by a bracket applied to a wall surface or may be supported on a stand (not shown).

The material from which the handle shields are formed is optional. It may be made of flexible paper or other cellulose material, polyisobutylene, plastic film, foil, or other suitable materials. Preferably, the material will be substantially waterproof in that condensation of vapor on the handle of the shopping cart would not penetrate through the material to the hands of the user of the cart, and vice versa.

The adhesive that is applied as the adhesive line 35 is of conventional design so as to make firm contact with the surface of the shield to which it is applied and to adhere to the facing surface of the shield.

Figure 8:
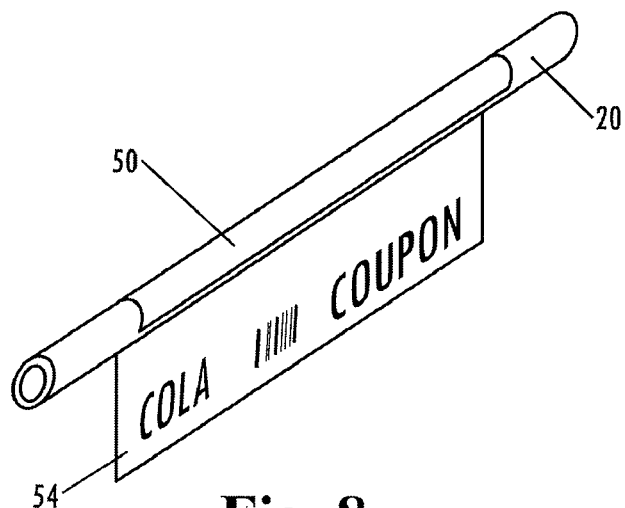
FIG. 8 is a perspective view of another embodiment of the invention, showing the shopping cart sleeve extending part way about the handle of the shopping cart and adhered directly to the handle.
Figure 9:
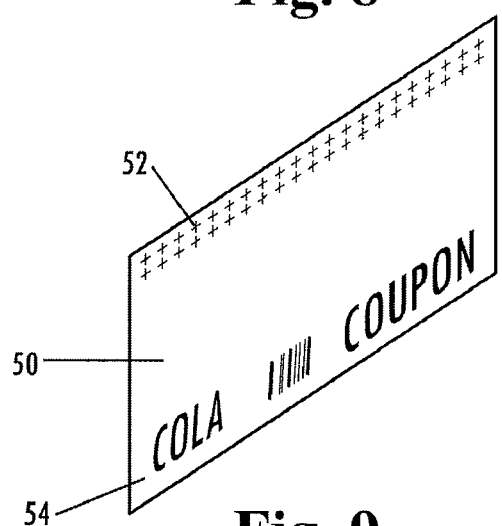
FIG. 9 is a perspective view of a layout of the shopping cart sleeve of FIG. 8.
Figure 10:
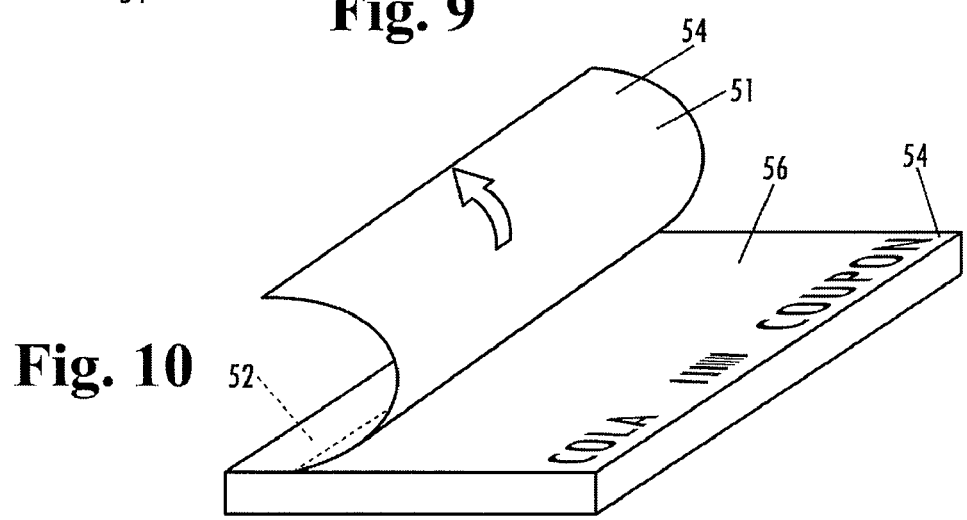
FIG. 10 is a view of a connected series of the shopping cart sleeves.

FIGS. 8-10 show another form of the handle shield 50 that has its line of adhesive 52 that directly attaches to the handle 20 of the shopping cart. The line of adhesive is positioned adjacent one edge of the handle shield and the shopper applies the line of adhesive to one side of the handle and drapes the rest of the handle shield over the handle, with the hang tag 54 suspended below the handle.

FIG. 10 shows that the handle shields 50 can be manufactured in overlying stacked arrangement that forms a tablet 56 with the lines of adhesive of each shield at one edge of the tablet. This allows the user to grasp the free end of the shield on the top of the tablet, peel the top shield away from the tablet and apply the sheet to the handle of the cart in the manner as shown in FIG. 8.

The advertisements, coupons, and/or bar codes can be applied to the material of the handle shield by various means such as by printing directly onto the material of the handle shield, or by adhesively applying the advertisements, etc. to the handle shield so that they can be easily removed from the handle shield at the check-out counter. The printing of the advertisements, etc. on the handle shields, such as the handle shield of FIGS. 8-10, may be on opposed surfaces of the shield for displaying the advertisements in opposite directions.

The handle shield 22 should be of a length that covers a major portion of the handle 20 of the shopping cart so as to adequately cover the handle and protect the user of the cart from direct contact with the handle. Also, the longer the length of the handle shield, the longer the hang tag 28 and the more information concerning advertisements, coupons, etc. can be applied thereto. Also, the tail or hang tag of the handle shield formed by the opposed end portions 24 and 25 can be made longer for more advertising space. The advertising material can be applied to the curved body portion 23 of the handle shield so that the information more directly faces the customer, if desired.

It can be seen that it is unlikely that the shopping cart handle sanitary protector shield will be discarded within the retail store before the shopper reaches the check out counter because the shield provides the sanitary function that is likely to be desirable to the shopper, and it provides the shopper with immediate information concerning the coupons for the goods that are advertised on the hang tag of the sleeve and the coupons must be redeemed at the check out counter.

Although preferred embodiments of the invention have been disclosed in detail herein, it will be obvious to those skilled in the art that variations and modifications of the disclosed embodiments can be made without departing from the spirit and scope of the invention as set forth in the following claims.

I claim:

1. A method of applying a shield to a handle of a grocery cart while shopping comprising:

providing a sheet of material having a front surface and a reverse surface, coupons applied to said front surface and adhesive applied to the reverse surface, the sheet having a length that covers a major portion of the length of the handle of the grocery cart and a width greater than the circumference of the handle of the grocery cart, forming the sheet in a U-shape and extending the sheet in its U-shape about the handle with the legs of the U-shape straddling the handle, connecting the sheet about the handle with the adhesive to form a sleeve about the handle that covers at least a major portion of the handle of the shopping cart and a hang tag with the coupons exhibited on the hang tag hanging from the handle, shielding at least a major portion of the handle of the cart with the sleeve from contacting the user of the cart, placing goods in the cart, and redeeming the coupons for some of the goods placed in the cart at a check out station.

2. The method of claim 1 and further including the step of applying a disinfectant to the handle of the grocery shopping cart and with the shield covering the disinfectant.

3. A handle shield for a handle of a shopping cart, comprising:

a single ply of sheet material having a front surface and a back surface and having a length sufficient to cover at least a major portion of the handle of the shopping cart and a width more than sufficient to wrap around the handle of the shopping cart, the sheet material is arranged in a U-shape with an intermediate body portion that curves about the handle of the shopping cart to shield the hands of a shopper from physical contact with the handle of the shopping cart and a pair of opposed end portions extending below the handle in superposed relationship with each other, advertisements applied to the front surface of the sheet material at the opposed ends so that the advertisements are visible on both surfaces of the handle shield when the end portions of the sheet material are in superposed relationship, an adhesive applied to the back surface of the sheet material that connects the opposed end portions to each other such that a handle sleeve is formed by the intermediate body portion about the handle of the shopping cart and a hang tag is formed by the end portions and the hang tag is suspended from the handle of the cart, the advertisements comprising at least two of the advertisements of goods, coupons related to goods that are advertised, and bar codes that relate to the goods, so that when the bar code is read, the customer may be provided with a benefit as advertised on the handle shield.

4. A handle shield for a handle of a shopping cart for protecting a shopper from contact with the handle of the shopping cart and for marketing goods to the shopper using the shopping cart when in use in a retail store comprising:

a single ply of sheet material having a front surface and a back surface and having a length sufficient to cover at least a major portion of the handle of the shopping cart and a width more than sufficient to wrap around the handle of the shopping cart and to form a hang tag extending below the handle of the shopping cart and that is visible to the shopper that uses the cart, the sheet material arranged in a U-shape with a portion of the back surface of the sheet material curving about the handle of the shopping cart so that the front surface of the sheet material shields the hands of a shopper from physical contact with the handle of the shopping cart, an advertisement applied to the front surface of the sheet material on the hang tag so that the advertisement is visible to the shopper using the cart, an adhesive applied to the back surface of the sheet material for connecting the sheet material about the handle such the hang tag is suspended from the handle of the cart.

* * * * *